US012094498B1

United States Patent
Goncharov et al.

(10) Patent No.: US 12,094,498 B1
(45) Date of Patent: Sep. 17, 2024

(54) RECORDING HEAD WITH A MULTILAYER SPIN TORQUE ELEMENT HAVING POSITIVE AND NEGATIVE BETA MATERIALS

(71) Applicant: Western Digital Technologies, Inc., San Jose, CA (US)

(72) Inventors: Alexander Goncharov, Morgan Hill, CA (US); James Mac Freitag, Sunnyvale, CA (US); Susumu Okamura, San Jose, CA (US); Muhammad Asif Bashir, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 18/355,114

(22) Filed: Jul. 19, 2023

Related U.S. Application Data

(60) Provisional application No. 63/507,921, filed on Jun. 13, 2023.

(51) Int. Cl.
*G11B 5/31* (2006.01)
*G11B 5/00* (2006.01)

(52) U.S. Cl.
CPC ...... *G11B 5/312* (2013.01); *G11B 2005/0024* (2013.01)

(58) Field of Classification Search
None
See application file for complete search history.

(56) References Cited

U.S. PATENT DOCUMENTS

| 8,488,373 | B2 | 7/2013 | Zhang et al. | |
| 8,537,497 | B2 | 9/2013 | Nagasaka et al. | |
| 9,305,574 | B1 | 4/2016 | Nagasaka et al. | |
| 10,706,877 | B2 | 7/2020 | Goncharov et al. | |
| 10,937,450 | B1 * | 3/2021 | Kawasaki | G11B 5/1278 |
| 11,289,118 | B1 * | 3/2022 | Kaiser | G11B 5/1278 |
| 11,568,891 | B1 * | 1/2023 | Chen | G11B 5/314 |
| 11,881,236 | B2 * | 1/2024 | Freitag | G11B 5/1278 |

(Continued)

FOREIGN PATENT DOCUMENTS

WO 2016076799 A1 5/2016

OTHER PUBLICATIONS

Hirofumi Suto et al., Study on FeCr thin film for a spintronic material with negative spin polarization, Journal of Magnetism and Magnetic Materials, vol. 557, 2022.

(Continued)

*Primary Examiner* — William J Klimowicz
(74) *Attorney, Agent, or Firm* — PATTERSON + SHERIDAN, LLP

(57) ABSTRACT

The present disclosure generally relates to a spin torque element disposed between a main pole and a shield in a magnetic recording head. The shield could be a trailing shield, a side shield, or a leading shield. The spin torque element includes a dual layer spin transfer structure that is spaced from magnetic layers on either side using spacer layers. One magnetic layer that faces a positive polarizer has a positive polarization while another magnetic layer facing the negative polarizer has a negative polarization. As such, torque in the spacer layers is maximized when the direction of the magnetization in the STL is opposite to the gap field.

20 Claims, 8 Drawing Sheets

(56) References Cited

U.S. PATENT DOCUMENTS

| | | | |
|---|---|---|---|
| 2003/0137785 A1* | 7/2003 | Saito | H01F 10/3277 |
| | | | 360/324.11 |
| 2004/0141260 A1* | 7/2004 | Hasegawa | B82Y 25/00 |
| 2004/0218311 A1* | 11/2004 | Saito | G01R 33/093 |
| | | | 360/324.12 |
| 2011/0293967 A1 | 12/2011 | Zhang et al. | |
| 2016/0086623 A1* | 3/2016 | Nagasaka | G11B 5/235 |
| | | | 360/125.3 |
| 2023/0410841 A1* | 12/2023 | Freitag | G11B 5/3146 |
| 2024/0144962 A1* | 5/2024 | Asif Bashir | G11B 5/3116 |
| 2024/0144963 A1* | 5/2024 | Asif Bashir | G11B 5/3116 |

OTHER PUBLICATIONS

X. Zhu et al., "Bias-Field-Free Microwave Oscillator Driven by Perpendicularly Polarized Spin Current," in IEEE Transactions on Magnetics, vol. 42, No. 10, pp. 2670-2672, Oct. 2006.

* cited by examiner

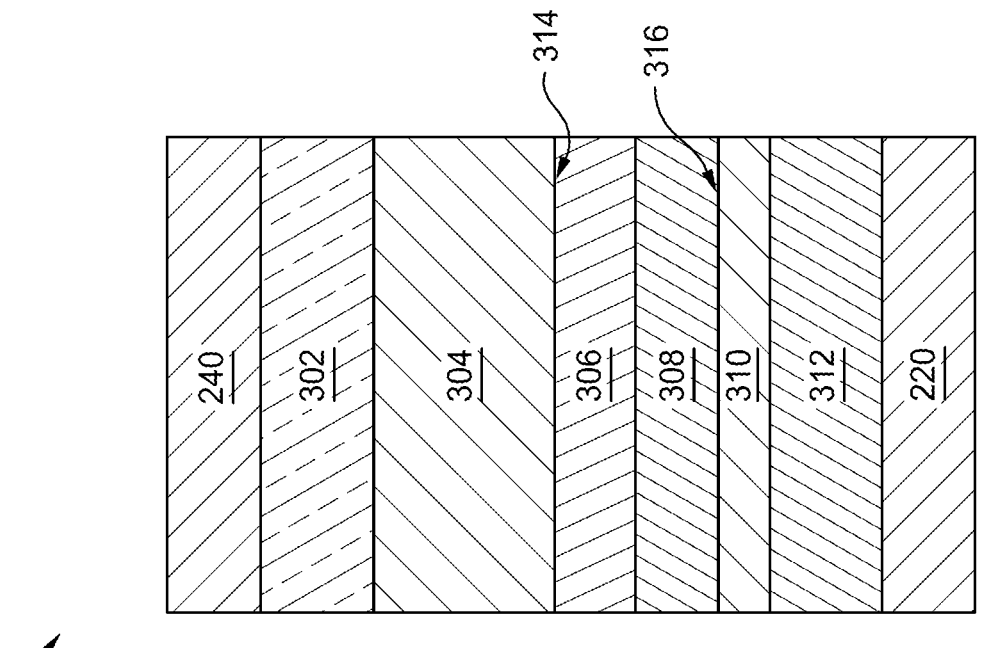
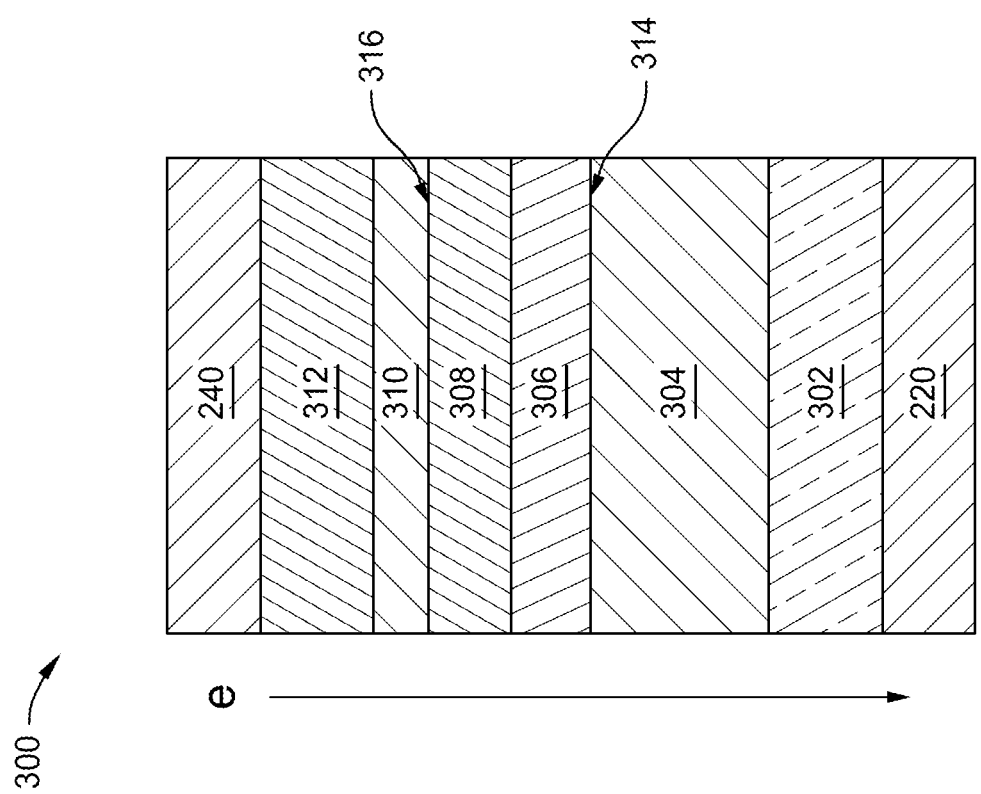
FIG. 3B
FIG. 3A

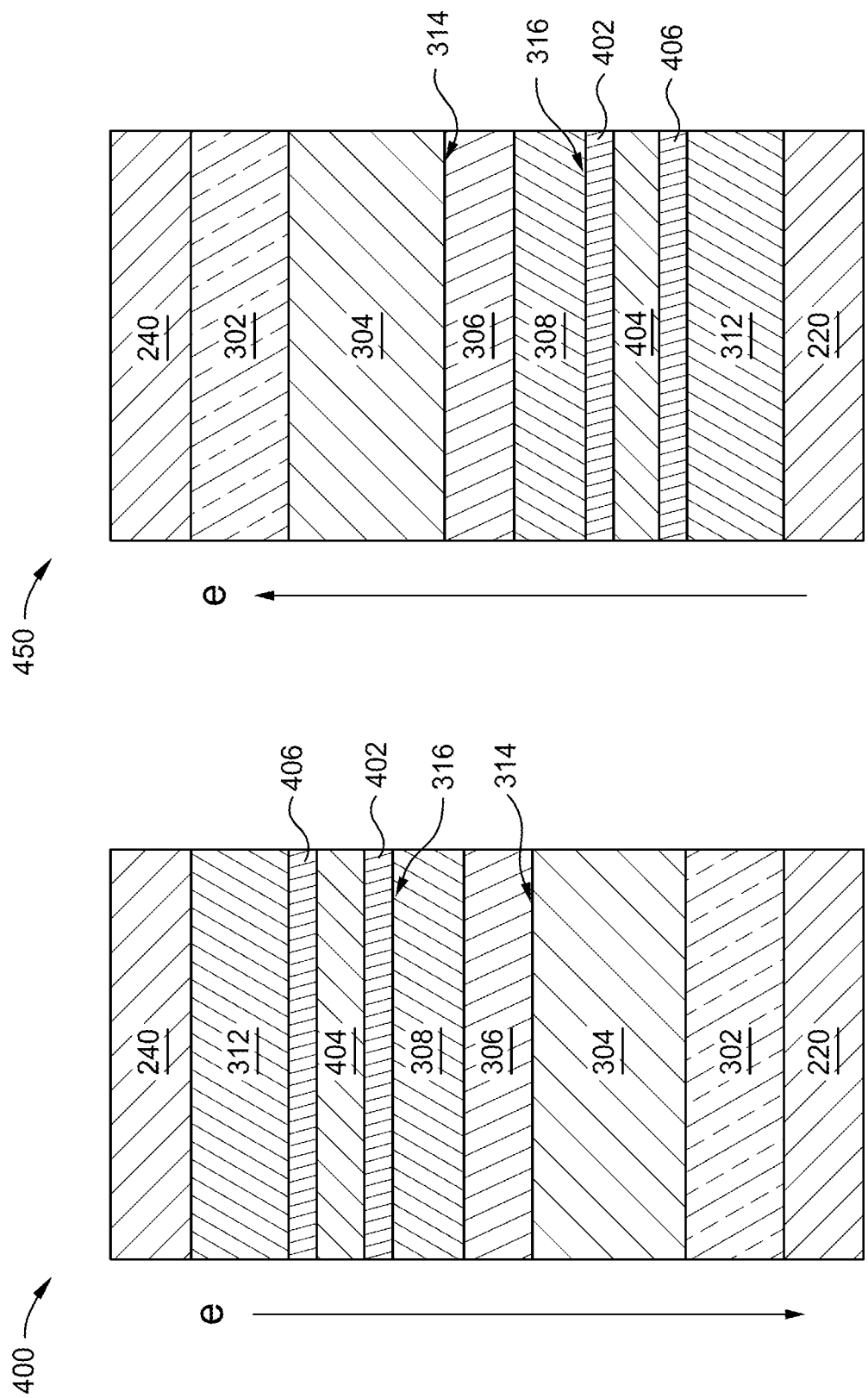

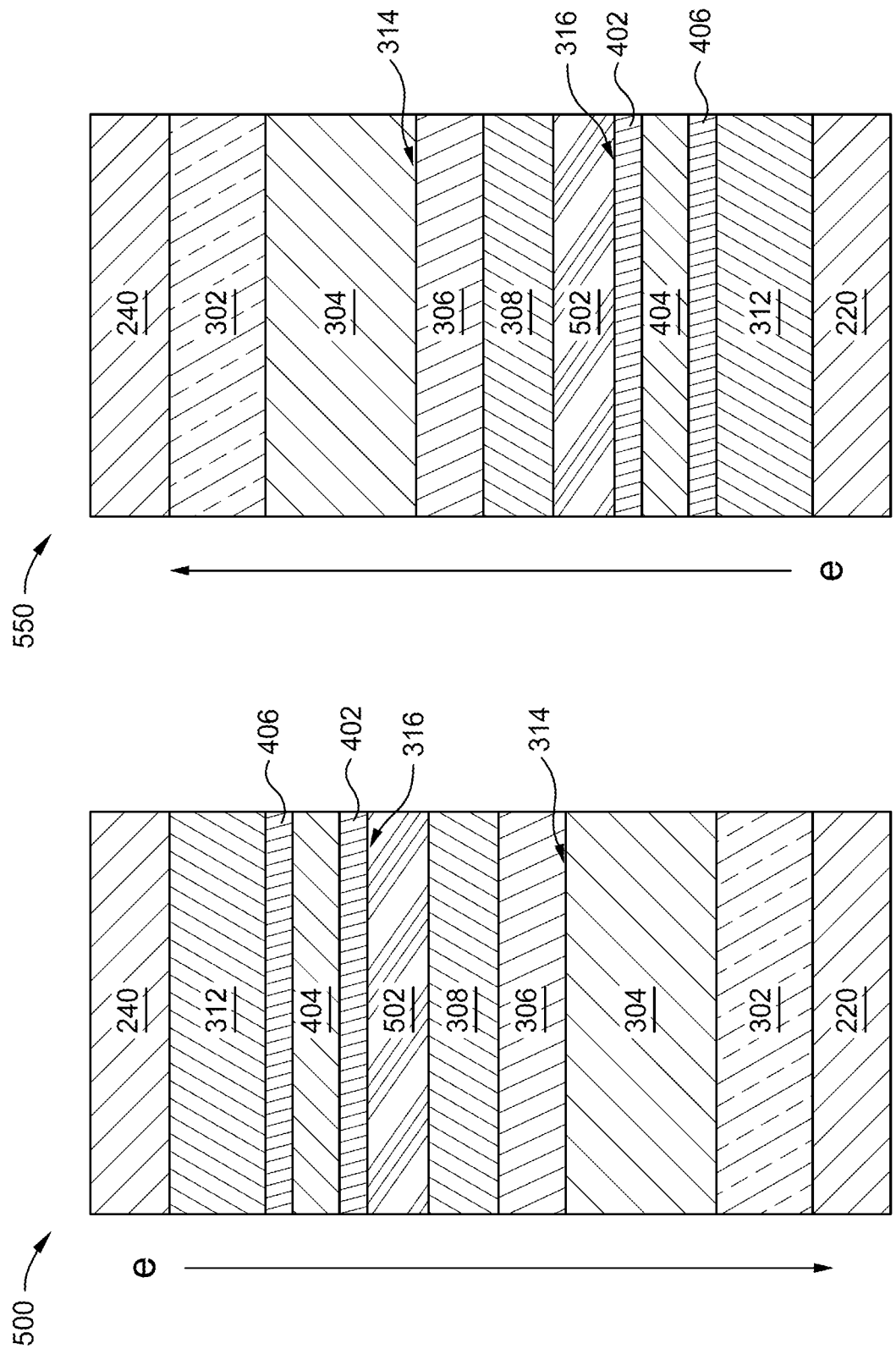

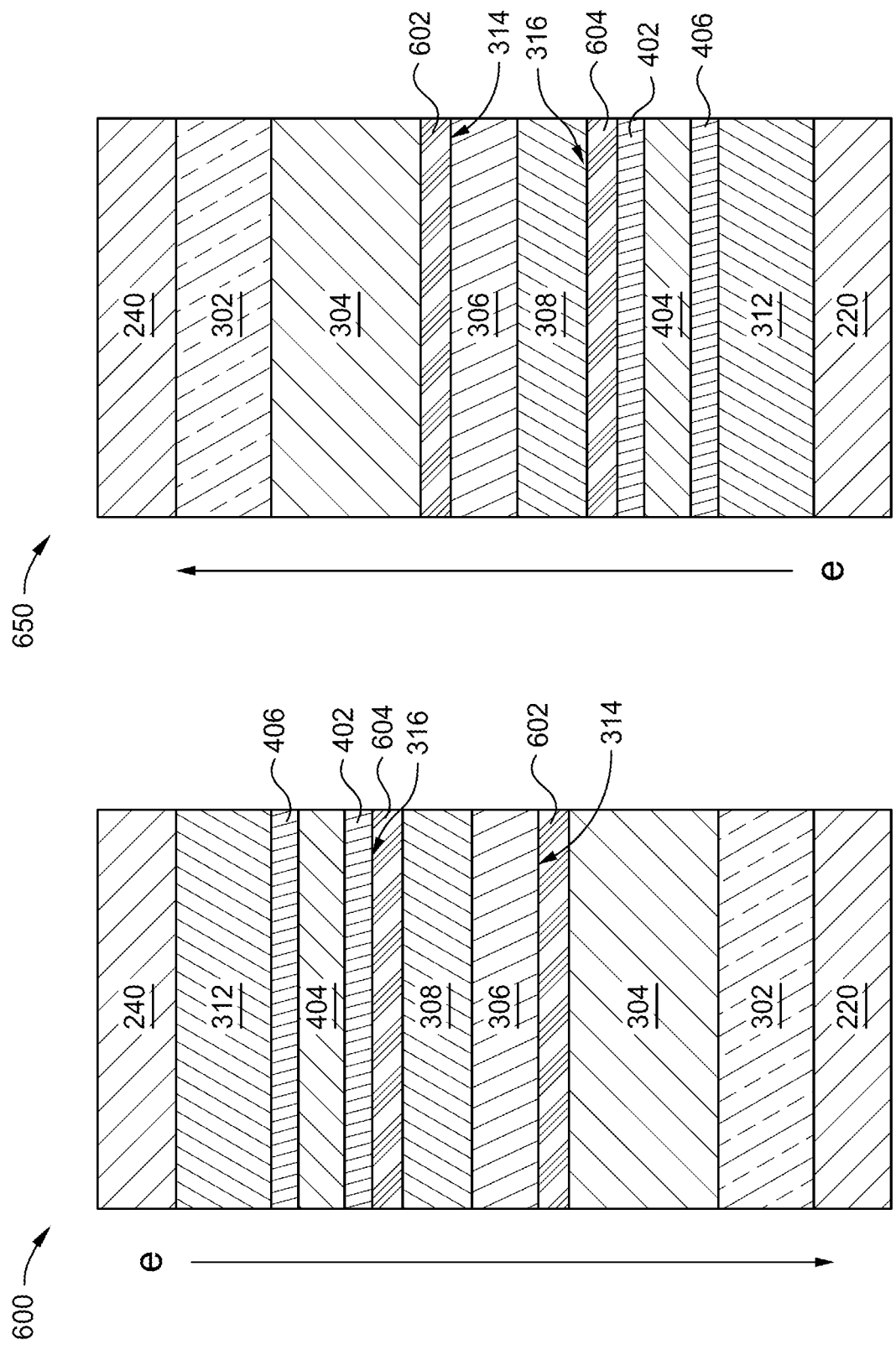

RECORDING HEAD WITH A MULTILAYER SPIN TORQUE ELEMENT HAVING POSITIVE AND NEGATIVE BETA MATERIALS

CROSS-REFERENCE TO RELATED APPLICATIONS

This application claims benefit of U.S. Provisional Patent Application Ser. No. 63/507,921, filed Jun. 13, 2023, which is herein incorporated by reference.

BACKGROUND OF THE DISCLOSURE

Field of the Disclosure

Embodiments of the present disclosure generally relate to a magnetic recording system comprising a magnetic recording head having a spin torque element.

Description of the Related Art

Over the past few years, various magnetic recording methods have been studied to improve the areal density of a magnetic media device, such as a hard disk drive (HDD). Magnetic recording heads, or write heads, in HDDs can have a significant effect on the overall performance and reliability of the recording device. Magnetic recording heads may be designed to achieve specific advantages, such as improved performance, but may consequently have a negative impact on other characteristics, such as decreased reliability.

For example, microwave-assisted magnetic recording (MAMR) is one type of energy-assisted recording technology to improve the recording density of a magnetic recording medium, such as a HDD. In MAMR, a spin torque oscillator (STO) device or a spin torque element is located next to or near the write element such that in operation the STO enhances the write field of the write pole. In addition, the STO produces a high-frequency AC field, such as in a microwave frequency band, that reduces an effective coercivity of a magnetic recording medium used to store data and allows writing of the magnetic recording medium at lower magnetic writing fields emanated from the write pole. Thus, higher recording density of the magnetic recording medium may be achieved by MAMR technology. As STO or spin torque elements improve, so does the recording density achievable.

Therefore, there is a need in the art for an improved STO or spin torque element.

SUMMARY OF THE DISCLOSURE

The present disclosure generally relates to a spin torque element disposed between a main pole and a shield in a magnetic recording head. The shield could be a trailing shield, a side shield, or a leading shield. The spin torque element includes a dual layer spin transfer structure that is spaced from magnetic layers on either side using spacer layers. One magnetic layer that faces a positive polarizer has a positive polarization while another magnetic layer facing the negative polarizer has a negative polarization. As such, torque in the spacer layers is maximized when the direction of the magnetization in the STL is opposite to the gap field.

In one embodiment, a magnetic recording head comprises: a main pole; a trailing shield; one or more side shields; a leading shield; and a spin torque element disposed between the main pole and one or more of the trailing shield, the one or more side shields, and the leading shield, the spin torque element comprising: a first spin torque layer comprising a first magnetic spin torque layer comprising a negative beta material; a second magnetic spin torque layer comprising a positive beta material; and a magnetic layer configured to polarize an electron flow into the first magnetic spin torque layer, wherein the first magnetic spin torque layer is between the magnetic layer and second magnetic spin torque layer.

In another embodiment, a magnetic recording head comprises: a main pole; a trailing shield; one or more side shields; a leading shield; and a spin torque element disposed between the main pole and one or more of the trailing shield, the one or more side shields, and the leading shield, the spin torque element comprising: a multilayer spin torque layer structure, wherein the multilayer spin torque structure comprises a first spin torque layer and a second spin torque layer disposed thereon, wherein the first spin torque layer comprises a negative beta material, and wherein the second spin torque layer comprises a positive beta material, wherein the first spin torque layer is disposed closer to a location where current is flows from during operation as compared to the second spin torque layer; and a multilayer spacer layer structure, wherein the multilayer spacer layer includes at least one layer comprising ruthenium.

In another embodiment, a magnetic recording head comprises: a main pole; a trailing shield; one or more side shields; a leading shield; and a spin torque element disposed between the main pole and one or more of the trailing shield, the one or more side shields, and the leading shield, the spin torque element comprising: a first spin torque layer comprising a positive beta material; a second spin torque layer comprising a negative beta material disposed upon the first spin torque layer; and a third spin torque layer comprising the positive beta material disposed upon the second spin torque layer.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIGS. 3A and 3B are schematic illustrations of spin torque elements according to one embodiment.

FIGS. 4A and 4B are schematic illustrations of spin torque elements according to another embodiment.

FIGS. 5A and 5B are schematic illustrations of spin torque elements according to another embodiment.

FIGS. 6A and 6B are schematic illustrations of spin torque elements according to another embodiment.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to a spin torque element disposed between a main pole and a shield in a magnetic recording head. The spin torque element includes a dual layer spin transfer structure that is spaced from magnetic layers on either side using spacer layers. One magnetic layer that faces a positive polarizer has a positive polarization while another magnetic layer facing the negative polarizer has a negative polarization. As such, torque in the spacer layers is maximized when the direction of the magnetization in the STL is opposite to the gap field.

Figure 1:
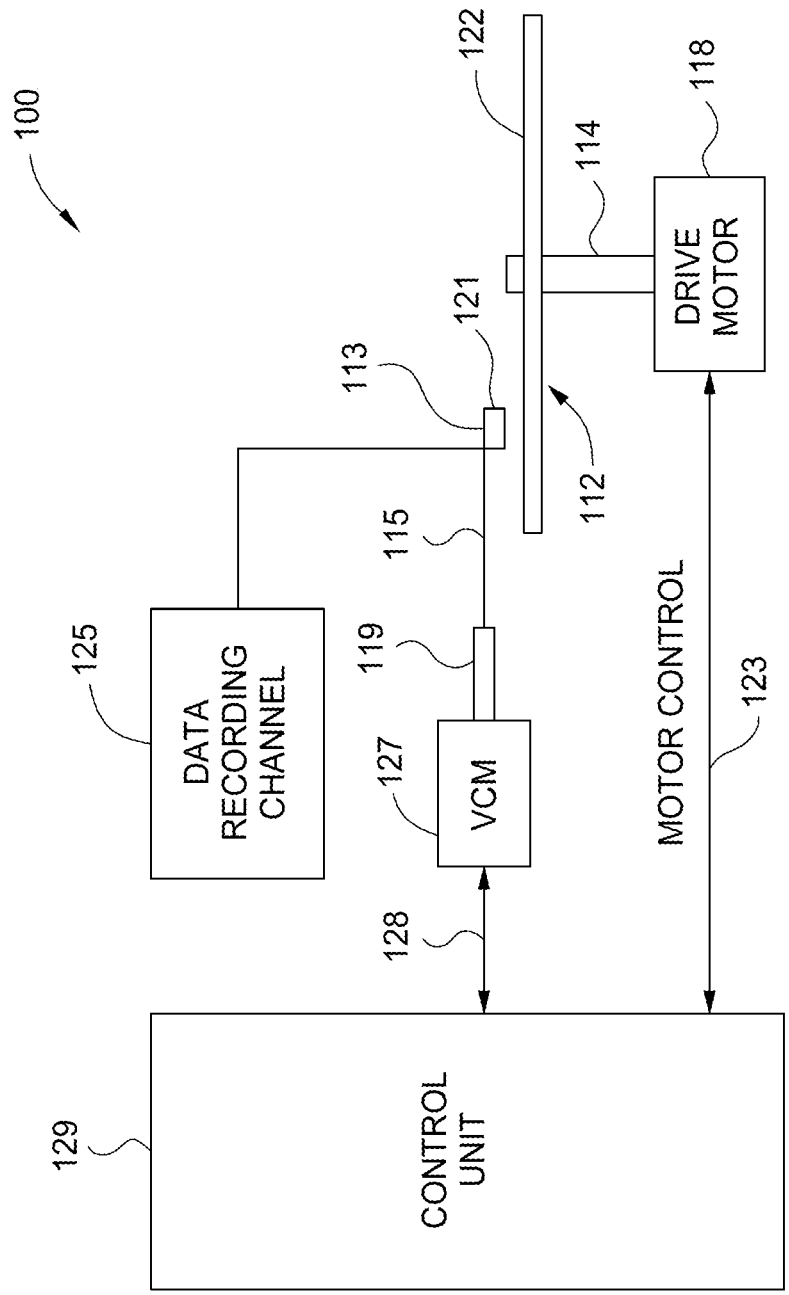
FIG. 1 illustrates a disk drive embodying this disclosure.

FIG. 1 is a schematic illustration of a magnetic recording device 100, according to one implementation. The magnetic recording device 100 includes a magnetic recording head, such as a write head. The magnetic recording device 100 is a magnetic media drive, such as a hard disk drive (HDD). Such magnetic media drives may be a single drive/device or include multiple drives/devices. For the ease of illustration, a single disk drive is shown as the magnetic recording device 100 in the implementation illustrated in FIG. 1. The magnet recording device 100 (e.g., a disk drive) includes at least one rotatable magnetic disk 112 supported on a spindle 114 and rotated by a drive motor 118. The magnetic recording on each rotatable magnetic disk 112 is in the form of any suitable patterns of data tracks, such as annular patterns of concentric data tracks on the rotatable magnetic disk 112.

At least one slider 113 is positioned near the rotatable magnetic disk 112. Each slider 113 supports a head assembly 121. The head assembly 121 includes one or more magnetic recording heads (such as read/write heads), such as a write head including a spin torque element. As the rotatable magnetic disk 112 rotates, the slider 113 moves radially in and out over the disk surface 122 so that the head assembly 121 may access different tracks of the rotatable magnetic disk 112 where desired data are written. Each slider 113 is attached to an actuator arm 119 by way of a suspension 115. The suspension 115 provides a slight spring force which biases the slider 113 toward the disk surface 122. Each actuator arm 119 is attached to an actuator 127. The actuator 127 as shown in FIG. 1 may be a voice coil motor (VCM).

The VCM includes a coil movable within a fixed magnetic field, the direction and speed of the coil movements being controlled by the motor current signals supplied by a control unit 129.

The head assembly 121, such as a write head of the head assembly 121, includes a media facing surface (MFS) such as an air bearing surface (ABS) that faces the disk surface 122. During operation of the magnetic recording device 100, the rotation of the rotatable magnetic disk 112 generates an air or gas bearing between the slider 113 and the disk surface 122 which exerts an upward force or lift on the slider 113. The air or gas bearing thus counter-balances the slight spring force of suspension 115 and supports the slider 113 off and slightly above the disk surface 122 by a small, substantially constant spacing during operation.

The various components of the magnetic recording device 100 are controlled in operation by control signals generated by control unit 129, such as access control signals and internal clock signals. The control unit 129 includes logic control circuits, storage means and a microprocessor. The control unit 129 generates control signals to control various system operations such as drive motor control signals on a line 123 and head position and seek control signals on a line 128. The control signals on line 128 provide the desired current profiles to optimally move and position slider 113 to the desired data track on rotatable magnetic disk 112. Write and read signals are communicated to and from the head assembly 121 by way of recording channel 125. In one embodiment, which can be combined with other embodiments, the magnetic recording device 100 may further include a plurality of media, or disks, a plurality of actuators, and/or a plurality number of sliders.

Figure 2:
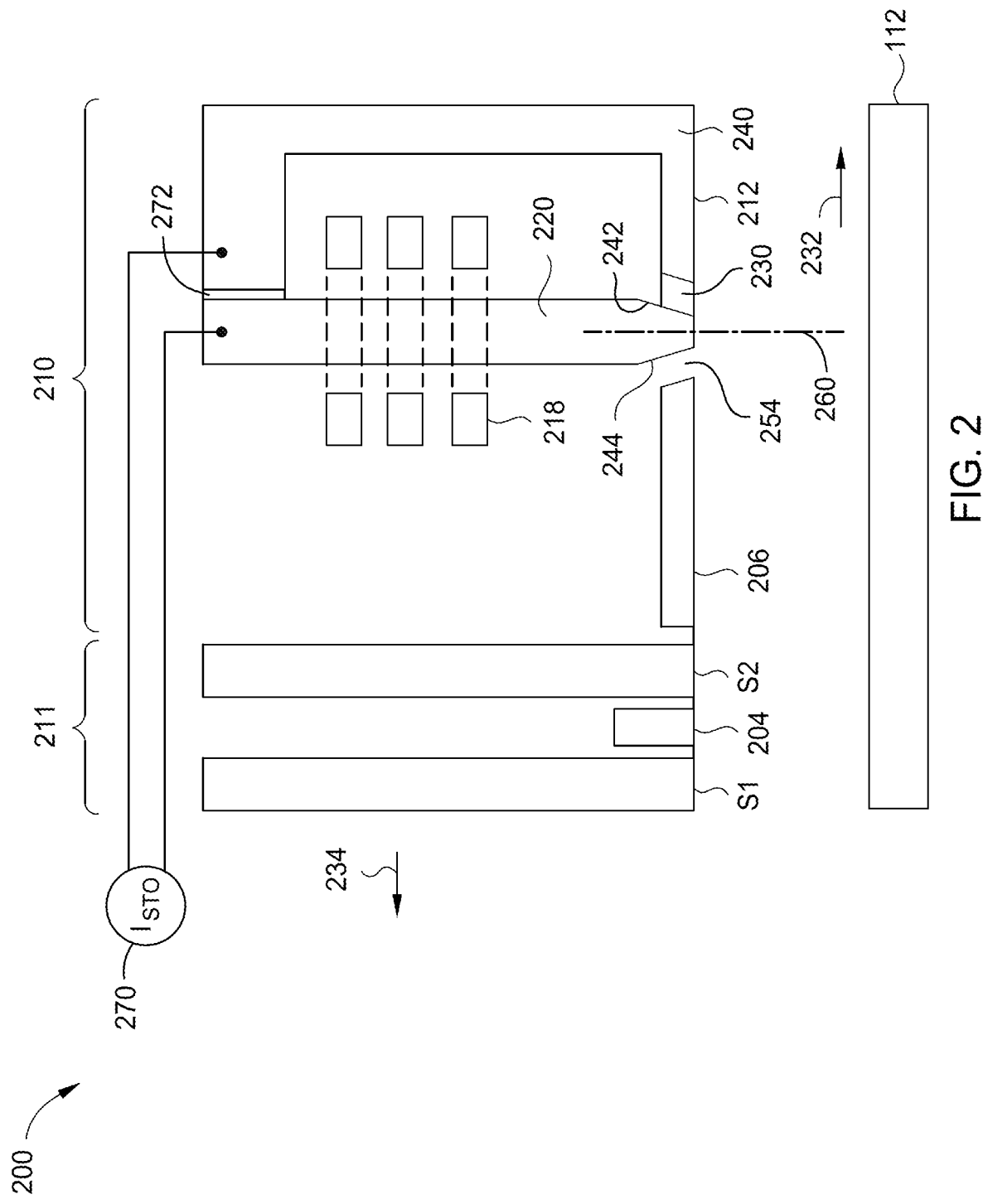
FIG. 2 is a fragmented, cross-sectional side view through the center of a read/write head facing a magnetic media, according to one embodiment.

FIG. 2 is a schematic illustration of a cross sectional side view of a head assembly 200 facing the rotatable magnetic disk 112 shown in FIG. 1 or other magnetic storage medium, according to one implementation. The head assembly 200 may correspond to the head assembly 121 described in FIG. 1. The head assembly 200 includes a media facing surface (MFS) 212, such as an air bearing surface (ABS), facing the rotatable magnetic disk 112. As shown in FIG. 2, the rotatable magnetic disk 112 relatively moves in the direction indicated by the arrow 232 and the head assembly 200 relatively moves in the direction indicated by the arrow 233.

In one embodiment, which can be combined with other embodiments, the head assembly 200 includes a magnetic read head 211. The magnetic read head 211 may include a sensing element 204 disposed between shields S1 and S2. The sensing element 204 is a magnetoresistive (MR) sensing element, such an element exerting a tunneling magneto-resistive (TMR) effect, a magneto-resistance (GMR) effect, an extraordinary magneto-Resistive (EMR) effect, or a spin torque oscillator (STO) effect. The magnetic fields of magnetized regions in the rotatable magnetic disk 112, such as perpendicular recorded bits or longitudinal recorded bits, are detectable by the sensing element 204 as the recorded bits.

The head assembly 200 includes a write head 210. In one embodiment, which can be combined with other embodiments, the write head 210 includes a main pole 220, a leading shield 206, a trailing shield (TS) 240, and a spin torque element 230 disposed between the main pole 220 and the TS 240. The main pole 220 serves as a first electrode. Each of the main pole 220, the spin torque element 230, the leading shield 206, and the trailing shield (TS) 240 has a front portion at the MFS.

The main pole 220 includes a magnetic material, such as CoFe, CoFeNi, or FeNi, other suitable magnetic materials. In one embodiment, which can be combined with other embodiments, the main pole 220 includes small grains of magnetic materials in a random texture, such as body-centered cubic (BCC) materials formed in a random texture. In one example, a random texture of the main pole 220 is formed by electrodeposition. The write head 210 includes a coil 218 around the main pole 220 that excites the main pole 220 to produce a writing magnetic field for affecting a magnetic recording medium of the rotatable magnetic disk 112. The coil 218 may be a helical structure or one or more sets of pancake structures.

In one embodiment, which can be combined with other embodiments, the main pole 220 includes a trailing taper 242 and a leading taper 244. The trailing taper 242 extends from a location recessed from the MFS 212 to the MFS 212. The leading taper 244 extends from a location recessed from the MFS 212 to the MFS 212. The trailing taper 242 and the leading taper 244 may have the same degree or different degree of taper with respect to a longitudinal axis 260 of the main pole 220. In one embodiment, which can be combined with other embodiments, the main pole 220 does not include the trailing taper 242 and the leading taper 244. In such an embodiment, the main pole 220 includes a trailing side and a leading side in which the trailing side and the leading side are substantially parallel.

The TS 240 includes a magnetic material, such as FeNi, or other suitable magnetic materials, serving as a second electrode and return pole for the main pole 220. The leading shield 206 may provide electromagnetic shielding and is separated from the main pole 220 by a leading gap 254.

In some embodiments, the spin torque element 230 is positioned proximate the main pole 220 and enhances the write field from the main pole. In operation, an electron current applied to the spin torque element 230 induces a spin current that switches the magnetization of a magnetic spin torque layer (STL) against a gap field of the write head, which enhances the recording field from the main pole to the media.

In one embodiment, which can be combined with other embodiments, the spin torque element 230 is electrically coupled to the main pole 220 and the TS 240. The main pole 220 and the TS 240 are separated in an area by an insulating layer 272. The current source 270 may provide electron current to the spin torque element 230 through the main pole 220 and the TS 240. For direct current or pulsed current, the current source 270 may flow electron current from the main pole 220 through the spin torque element 230 to the TS 240 or may flow electron current from the TS 240 through the spin torque element 230 to the main pole 220 depending on the orientation of the spin torque element 230. In one embodiment, which can be combined with other embodiments, the spin torque element 230 is coupled to electrical leads providing an electron current other than from the main pole 220 and/or the TS 240.

Current enhanced perpendicular magnetic recording (ePMR) heads may use a magnetic layer in the gap (such as an STL in the spin torque element 230) in order to enhance write field and gradient. The magnetization in the magnetic layer is opposing the gap field during head operation. The direction of the magnetization is controlled by the spin transfer torque excreted by the conduction electrons upon reflection from the saturated high moment layer stitched to the trailing shield (forward stack) or to the main pole (reverse stack). These layers act as polarizers for the flux of conduction electrons. The strength of the torque is dictated by the polarization capability of those layers, and by the current density. The higher the angle (with an ideal value equal to 180 degrees with respect to the gap field direction, the better is writer performance).

The direction for design improvement in terms of performance and reliability would be enhancement of the spin torque acting on the magnetic layer in the gap. As discussed herein, a design is disclosed which has spin torque acting on the magnetic layer (e.g., the STL) from both sides. In one or more embodiments of one such design, the torque is acting on one side of the layer only. The idea involves sending electrons first through the magnetic layer with the negative effective polarization resulting in the additional torque acting on the magnetic layer. In some embodiments, the magnetic layer itself is designed as a bi-layer structure. The magnetic layer facing a polarizer with the negative polarization also has negative polarization ($1^{st}$ interface). The magnetic layer facing the positive polarizer has positive polarization ($2^{nd}$ interface).

By manufacturing such a structure, the torque in both spacers separating layer in the gap from two magnetic polarizers is maximized, which in turn will allow a magnetic layer in the gap with higher total moment, resulting in better areal density capability (ADC) performance. In some embodiments, the magnetic layer in the gap can have more than two layers to enhance required properties of effective polarization on each side.

It is to be understood that while description herein has referenced the spin torque element being disposed between the main pole and the trailing shield, the spin torque element may be disposed between the main pole and the leading shield or between the main pole and one or more side shields. Furthermore, it is to be understood that the spin torque element may be disposed in one or more locations including: between the main pole and the trailing shield; the main pole and the leading shield; and the main pole and one or more side shields.

Figure 9:
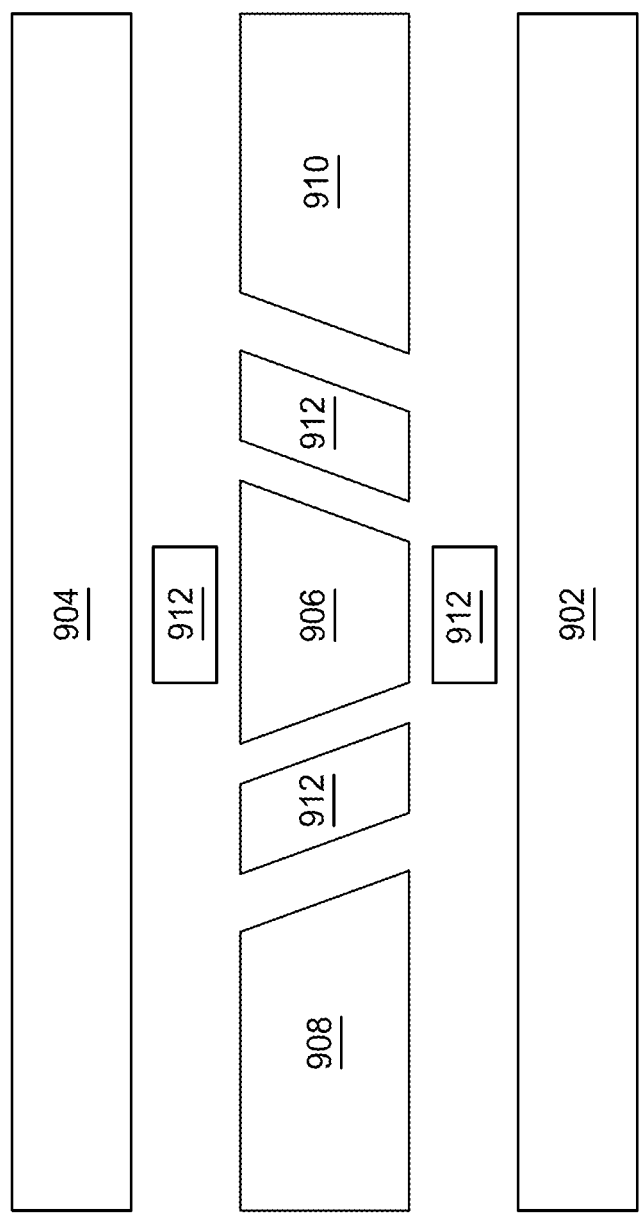
FIG. 9 is a schematic MFS view of a magnetic recording head according to certain embodiments.

The embodiments discussed herein will make reference to a spin torque element being disposed between a main pole and a trailing shield. It is to be understood that the spin torque element may be disposed in one of several locations, and that the depiction of the spin torque element between the main pole and trailing shield is simply for exemplification purposes. The spin torque element may be disposed between the main pole and the trailing shield, the main pole and the leading shield, the main pole and one or more side shields, and combinations thereof. FIG. 9 is a schematic MFS view of a magnetic recording head 900 according to certain embodiments. The head 900 includes a leading shield 902, a trailing shield 904, a main pole 906, and side shields 908, 910. A spin torque element 912 may be present at one or more locations shown in FIG. 9, namely between the main pole and the trailing shield, the main pole and the leading shield, the main pole and one or more side shields, and combinations thereof.

As shown in FIG. 9, the spin torque elements 912 positioned between the main pole 906 and side shields 908, 910 are rotated so that the layers of the layered structure of the spin torque elements 912 are layered from a respective side shield 908, 910 in a direction towards the main pole 906 rather than having the layers of the layered structure of the spin torque elements 912 parallel to the leading shield 902 or trailing shield 904.

FIGS. 3A and 3B are schematic illustrations of spin torque elements according to one embodiment. In FIG. 3A, the spin torque element 300 is disposed between the main pole 220 and TS 240 and electrons flow in the direction from the TS 240 towards the main pole 220. FIG. 3B illustrates a spin torque element 350 that is the reverse of the spin torque element 300 of FIG. 3A with the electron flow from the main pole 220 towards the TS 240.

As shown in FIG. 3A, a first magnetic layer 302 is disposed on the main pole 220. The first magnetic layer 302 may be a main pole notch. In one embodiment, the first magnetic layer 302 is optional. A main pole notch is a geometrical extension of the main pole into the trailing shield gap. A main pole notch may oftentimes be considered a part of a spin torque element disposed in the trailing gap. A first spacer layer 304 is disposed on the first magnetic layer 302. A first STL 306 is disposed on the first spacer layer 304 to create a first interface 314 between the first STL 306 and the first spacer layer 304. A second STL 308 is disposed on the first STL 306. A second spacer layer 310 is disposed on the second STL 308 to create a second interface 316 between the second STL 308 and the second spacer layer 310. A second magnetic layer 312 is disposed on the second spacer layer 310 and is in contact with the TS 240. The second magnetic layer 312 may be a TS 240 notch. A TS 240 notch is a geometrical extension of the TS 240 into the TS gap. A TS notch may oftentimes be considered a part of a spin torque element disposed in the trailing gap. In the case of both the main pole notch and the TS notch, the notches may not be present in certain embodiments because the main pole 220 itself or the TS 240 itself may function as the polarizer.

As shown in FIG. 3B, a first magnetic layer 302 is disposed on the TS 240. The first spacer layer 304 is disposed on the first magnetic layer 302. The first STL 306 is disposed on the first spacer layer 304 to create the first interface 314 between the first STL 306 and the first spacer layer 304. The second STL 308 is disposed on the first STL 306. The second spacer layer 310 is disposed on the second STL 308 to create the second interface 316 between the second STL 308 and the second spacer layer 310. The second magnetic layer 312 is disposed on the second spacer layer 310 and is in contact with the main pole 220. The first magnetic layer 302 and the second magnetic layer 312 may serve as respective TS notch and main pole notch as in the case of FIG. 3A.

Suitable materials for the first magnetic layer 302 include ferromagnetic materials such as CoFe, CoFeNi, and combinations thereof. The first magnetic layer 302 may have a thickness of between about 2 nm and about 5 nm and a width of between about 20 nm and about 50 nm. In regards to the description herein, the thickness is the distance at the MFS extending between the main pole 220 and TS 240 of a given layer (i.e., down-track direction) and the width is the distance at the MFS perpendicular to the thickness within the plane of the MFS (i.e., cross-track direction).

Suitable materials for the first spacer layer 304 include non-magnetic electrically conductive materials such as copper (Cu), silver (Ag), AgSn, ruthenium (Ru), and combinations thereof. The first spacer layer 304 may have a thickness of between about 2 nm and about 10 nm and a width of between about 20 nm and about 50 nm.

The first STL 306 comprises a positive beta material. Suitable materials for the first STL 306 include magnetic materials such as NiFe, CoFe, CoPt, CoPd, a Heusler alloy such as Cobalt-Manganese-Germanium (CMG), and combinations thereof. The first STL 306 may have a thickness of between about 2 nm and about 4 nm and a width of between about 20 nm and about 50 nm.

The second STL 308 comprises a negative beta material. Suitable materials for the second STL 308 include magnetic materials such as FeCr. The first STL 308 may have a thickness of between about 2 nm and about 4 nm and a width of between about 20 nm and about 50 nm.

Hence, the positive beta material (306) faces the main pole 220 in FIG. 3A and is closer to the main pole 220 compared to the negative beta material (308). Similarly in FIG. 3A, the negative beta material (308) is closer to the TS 240 compared to the positive beta material (306). Conversely, in FIG. 3B, the negative beta material (308) faces the main pole 220 in FIG. 3A and is closer to the main pole 220 compared to the positive beta material (306). Similarly in FIG. 3B, the positive beta material (306) is closer to the TS 240 compared to the negative beta material (308).

Suitable materials for the second spacer layer 310 include non-magnetic electrically conductive materials such as copper (Cu), chromium (Cr), ruthenium (Ru), and combinations thereof. The second spacer layer 310 may comprise a multilayer structure. In one embodiment, the second spacer layer 310 comprises a first chromium layer disposed on the second STL 308, a copper layer disposed on the first chromium layer, and a second chromium layer disposed on the copper layer. The second spacer layer 310 may have a thickness of between about 2 nm and about 5 nm and a width of between about 20 nm and about 50 nm.

Suitable materials for the second magnetic layer 312 include ferromagnetic materials with negative spin asymmetry such as FeCr. The second magnetic layer 312 may have a thickness of between about 2 nm and about 10 nm and a width of between about 20 nm and about 50 nm.

In one embodiment, the first magnetic layer 302 and the second magnetic layer 312 comprise different materials. Similarly, in one embodiment, the first and second spacer layers 304, 310 comprise the same materials. In some embodiments, all of the layers of the spin torque element have the same width though the various layers may have different thicknesses.

The first STL 306 and the second STL 308 are collectively considered a STL structure. The bi-layer STL structure enhances the torque in the spacer 310 for a better magnetic angle (i.e., as close as possible to 180 degrees with respect to the gap field). Such a design allows electrons first flow through the bi-layer STL structure with the negative effective polarization resulting in the additional torque acting on the bi-layer STL structure after the magnetization in the STL structure is flipped against the gap field. The second STL 308 facing such a polarizer with the negative polarization also has negative polarization, while the first STL 306 facing the positive polarizer has a positive polarization. The torque in both spacer layers 304 and 310 is maximized when the magnetization in the STL structure is opposite to the gap field, which will in turn enable the STL structure to have a higher total magnetic moment, resulting in better ADC performance.

FIGS. 4A and 4B are schematic illustrations of spin torque elements according to another embodiment. In FIG. 4A, the spin torque element 400 is disposed between the main pole 220 and TS 240 and the electron flow in the direction from the TS 240 towards the main pole 220. FIG. 4B illustrates a spin torque element 450 that is the reverse of the spin torque element 400 of FIG. 4A with the electron flow from the main pole 220 towards the TS 240.

As shown in FIG. 4A, the first magnetic layer 302 is disposed on the main pole 220. The first spacer layer 304 is disposed on the first magnetic layer 302. The first STL 306 is disposed on the first spacer layer 304 to create the first interface 314 between the first STL 306 and the first spacer layer 304. The second STL 308 is disposed on the first STL 306. Rather than a simple second spacer layer 310, FIG. 4A shows a multilayer spacer layer. In particular, a first subspacer layer 402 is disposed on the second STL 308 to create the second interface 316 between the second STL 308 and the first subspacer layer 402. A second subspacer layer 404 is disposed on the first subspacer layer 402. A third subspacer layer 406 is disposed on the second subspacer layer 404. The second magnetic layer 312 is disposed on the third subspacer layer 406 and is in contact with the TS 240.

As shown in FIG. 4B, the first magnetic layer 302 is disposed on the TS 240. The first spacer layer 304 is disposed on the first magnetic layer 302. The first STL 306 is disposed on the first spacer layer 304 to create the first interface 314 between the first STL 306 and the first spacer layer 304. The second STL layer 308 is disposed on the first STL 306. The first subspacer layer 402 is disposed on the second STL layer 308 to create the second interface 316 between the second STL 308 and the first subspacer layer 402. The second subspacer layer 404 is disposed on the first subspacer layer 402, and the third subspacer layer 406 is disposed on the second subspacer layer 404. The second magnetic layer 312 is disposed on the third subspacer layer 406 and is in contact with the main pole 220.

Hence, the positive beta material (306) faces the main pole 220 in FIG. 4A and is closer to the main pole 220 compared to the negative beta (308) material (308). Similarly in FIG. 4A, the negative beta material (308) is closer to the TS 240 compared to the positive beta material (306). Conversely, in FIG. 4B, the negative beta material (308) faces the main pole 220 in FIG. 3A and is closer to the main pole 220 compared to the positive beta material (306). Similarly in FIG. 4B, the positive beta material is closer to the TS 240 compared to the negative beta material.

Suitable materials for the first subspacer layer 402 include chromium, ruthenium, and combinations thereof. The first subspacer layer 402 may have a thickness of between about 0.5 nm and about 1 nm and a width of between about 20 nm and about 50 nm.

Suitable materials for the second subspacer layer 404 include copper, and alloys thereof. In one embodiment, the second subspacer layer 404 may comprise a multilayer structure of a copper layer sandwiched between two chromium layers. The second subspacer layer 404 may have a thickness of between about 1 nm and about 3 nm and a width of between about 20 nm and about 50 nm.

Suitable materials for the third subspacer layer 406 include chromium, ruthenium, and combinations thereof. The third subspacer layer 406 may have a thickness of between about 0.5 nm and about 1 nm and a width of between about 20 nm and about 50 nm. The three subspacer layers 402, 404, 406 result in an enhancement of the effective negative polarization of layers 308 and 312.

FIGS. 5A and 5B are schematic illustrations of spin torque elements according to another embodiment. In FIG. 5A, the spin torque element 500 is disposed between the main pole 220 and TS 240 and flow in the direction from the TS 240 towards the main pole 220. FIG. 5B illustrates a spin torque element 550 that is the reverse of the spin torque element 500 of FIG. 5A with the electron flow from the main pole 220 towards the TS 240.

As shown in FIG. 5A, the first magnetic layer 302 is disposed on the main pole 220. The first spacer layer 304 is disposed on the first magnetic layer 302. The first STL 306 is disposed on the first spacer layer 304 to create the first interface 314 between the first STL 306 and the first spacer layer 304. The second STL layer 308 is disposed on the first STL 306. As shown in FIG. 5A, a third STL layer 502 is disposed on the second STL layer 308. The first subspacer layer 402 is disposed on the third STL 502 to create the second interface 316 between the third STL 502 and the first subspacer layer 402. A second subspacer layer 404 is disposed on the first subspacer layer 402. A third subspacer layer 406 is disposed on the second subspacer layer 404. The second magnetic layer 312 is disposed on the third subspacer layer 406 and is in contact with the TS 240.

As shown in FIG. 5B, the first magnetic layer 302 is disposed on the TS 240. The first spacer layer 304 is disposed on the first magnetic layer 302. The first STL 306 is disposed on the first spacer layer 304 to create the first interface 314 between the first STL 306 and the first spacer layer 304. The second STL layer 308 is disposed on the first STL 306. The third STL 502 is disposed on the second STL layer 308. The first subspacer layer 402 is disposed on the third STL layer 502 to create the second interface 316 between the third STL 502 and the first subspacer layer 402. The second subspacer layer 404 is disposed on the first subspacer layer 402, and the third subspacer layer 406 is disposed on the second subspacer layer 404. The second magnetic layer 312 is disposed on the third subspacer layer 406 and is in contact with the main pole 220.

Suitable materials for the third STL layer 502 include Fe, Co, Ni, CoFe, NiFe, and combinations thereof. The third STL layer 502 may have a thickness of between about 1 nm and about 3 nm and a width of between about 20 nm and about 50 nm.

In the three-layer STL structure, the first STL 306 and the third STL layer 502 may comprise the same materials and hence, both comprise positive beta materials. Hence, the positive beta material (306) faces the main pole 220 in FIG. 5A and is closer to the main pole 220 compared to the negative beta material (308). Similarly in FIG. 5A, the positive beta material (502) is closer to the TS 240 compared to the negative beta material (308). Conversely, in FIG. 5B, even though the spin torque element is reversed compared to FIG. 5A, the positive beta material (502) faces the main pole 220 in FIG. 3A and is closer to the main pole 220 compared to the negative beta material (308). Similarly in FIG. 5B, the positive beta material (306) is closer to the TS 240 compared to the negative beta material (308).

FIGS. 6A and 6B are schematic illustrations of spin torque elements according to another embodiment. In FIG. 6A, the spin torque element 600 is disposed between the main pole 220 and TS 240 and flow in the direction from the TS 240 towards the main pole 220. FIG. 6B illustrates a spin torque element 650 that is the reverse of the spin torque element 600 of FIG. 6A with the electron flow from the main pole 220 towards the TS 240.

As shown in FIG. 6A, the first magnetic layer 302 is disposed on the main pole 220. The first spacer layer 304 is disposed on the first magnetic layer 302. A third magnetic layer 602 is disposed on the first spacer layer 304. The first STL 306 is disposed on the third magnetic layer 602 to create the first interface 314 between the first STL 306 and the third magnetic layer 602. The second STL layer 308 is disposed on the first STL 306. A fourth magnetic layer 604 is disposed on the second STL layer 308 to create the second interface 316. Rather than a simple second spacer layer 310, FIG. 6A shows a multilayer spacer layer. In particular, a first subspacer layer 402 is disposed on the fourth magnetic layer 604. A second subspacer layer 404 is disposed on the first subspacer layer 402. A third subspacer layer 406 is disposed on the second subspacer layer 404. The second magnetic layer 312 is disposed on the third subspacer layer 406 and is in contact with the TS 240.

As shown in FIG. 6B, the first magnetic layer 302 is disposed on the TS 240. The first spacer layer 304 is disposed on the first magnetic layer 302. The third magnetic layer 602 is disposed on the first spacer layer 304. The first STL 306 is disposed on the third magnetic layer 602 to create the first interface 314 between the first STL 306 and the third magnetic layer 602. The second STL layer 308 is disposed on the first STL 306. The fourth magnetic layer 604 is disposed on the second STL layer 308 to create the second interface 316. The first subspacer layer 402 is disposed on the fourth magnetic layer 604. The second subspacer layer 404 is disposed on the first subspacer layer 402, and the third subspacer layer 406 is disposed on the second subspacer layer 404. The second magnetic layer 312 is disposed on the third subspacer layer 406 and is in contact with the main pole 220.

Hence, the positive beta material (306) faces the main pole 220 in FIG. 6A and is closer to the main pole 220 compared to the negative beta material (308). Similarly in FIG. 6A, the negative beta material (308) is closer to the TS 240 compared to the positive beta material (306). Conversely, in FIG. 6B, the negative beta material (308) faces the main pole 220 in FIG. 3A and is closer to the main pole 220 compared to the positive beta material (306). Similarly in FIG. 6B, the positive beta material (306) is closer to the TS 240 compared to the negative beta material (308).

Suitable materials for the third magnetic layer 602 include ferromagnetic materials such as CoFe or Co, and combinations thereof. The third magnetic layer 602 may have a thickness of between about 0.5 nm and about 1 nm and a width of between about 20 nm and about 50 nm.

Suitable materials for the fourth magnetic layer 604 include ferromagnetic materials such as CoFe or Co, and combinations thereof. The fourth layer 604 may have a thickness of between about 0.5 nm and about 1 nm and a width of between about 20 nm and about 50 nm.

Figure 7A:
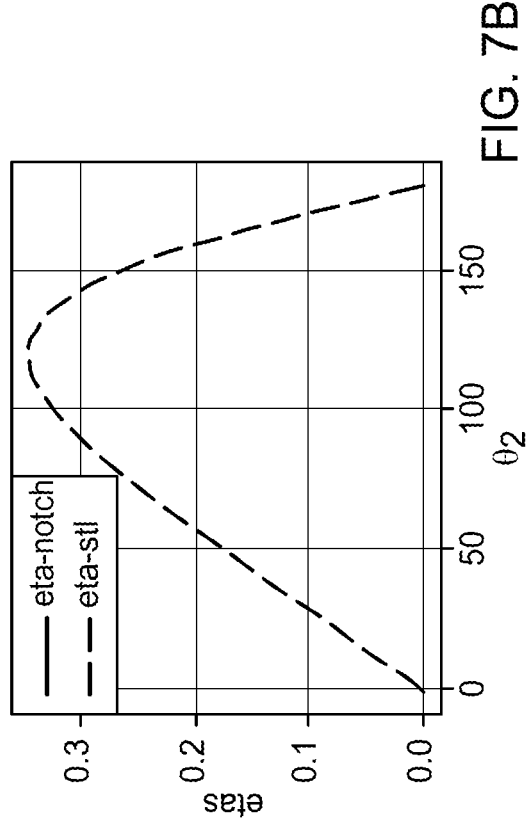
FIGS. 7A and 7B illustrate the negative torque and positive torque impacts of a single layer STL.
Figure 7B:
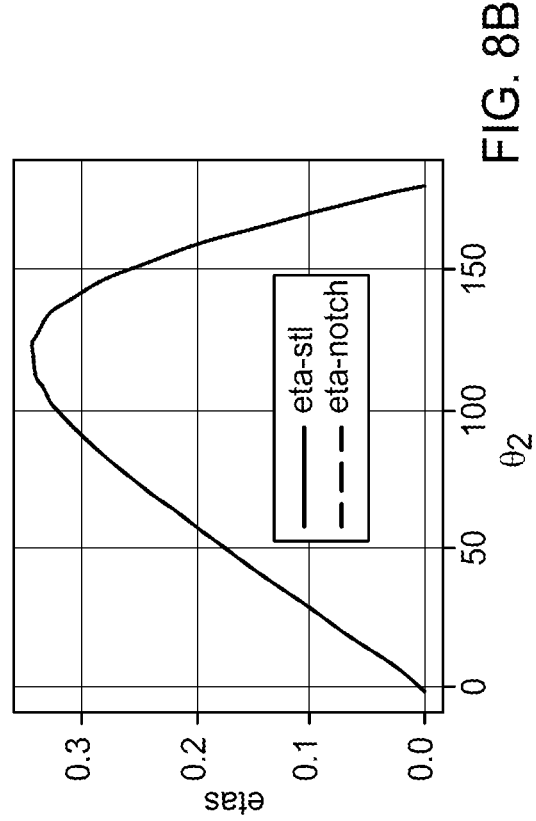

FIGS. 7A and 7B illustrate the negative torque and positive torque impacts of a single layer STL spin torque element where electron flow is from TS to main pole. In this configuration the STL is between two spacer layers, with one polarizer layer between the TS and one spacer layer, and another polarizer layer between the main pole and the other spacer layer. As shown in FIG. 7A, at the interface between the STL and the spacer layer closest to the TS has a direct torque from the TS notch with negative polarization ("eta-stl"), while FIG. 7B shows a torque at the interface between two layers with positive polarization: the single layer STL and the spacer layer closest to the main pole.

Figure 8A:
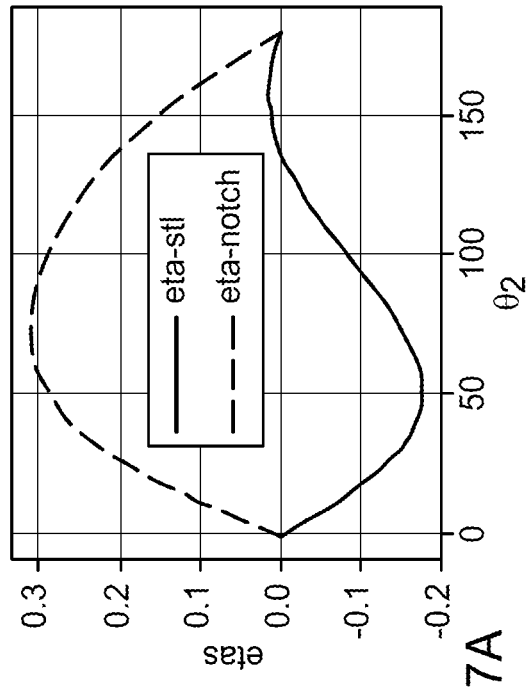
FIGS. 8A and 8B illustrate the negative torque and positive torque impacts of a multilayer STL.
Figure 8B:
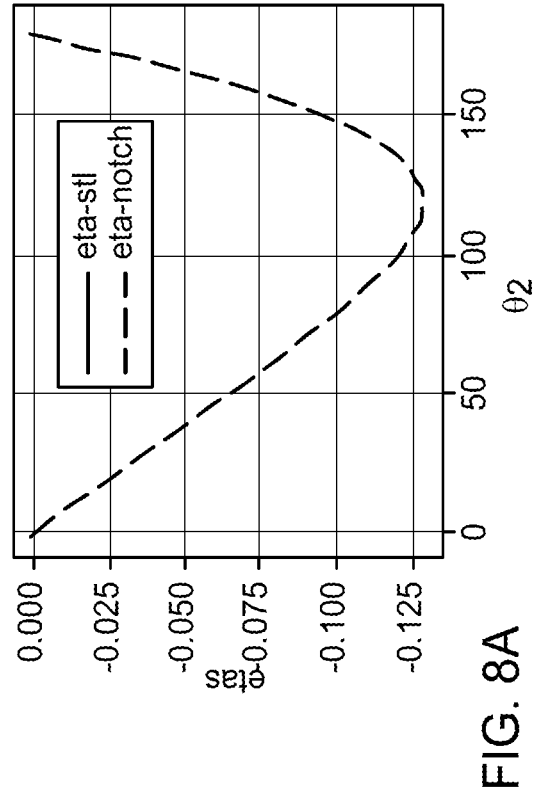

FIGS. 8A and 8B illustrate the torque acting on a multi-layer STL. As shown in FIG. 8A, the interface between the STL and the spacer layer closest to the TS (e.g., interface 316 in FIG. 3A) does show a negative torque angular dependence while FIG. 8B shows the positive torque angular dependence at the interface between the STL and the spacer layer closest to the main pole (e.g., interface 314 in FIG. 3A). In the two-layer STL design, when electron flow is from trailing shield to main pole, the positive beta STL faces the main pole and the negative beta faces the trailing shield. The stack configuration is reversed when electron flow goes from the main pole to the trailing shield.

More specifically, the bilayer STL structure has a first STL 306 adjacent a spacer layer 304 with an interface 314 therebetween, and a second STL 308 adjacent a second spacer layer 310 with an interface 316 therebetween. The first STL 306 and the second STL 308 are disposed adjacent one another. The first STL 306 will have one type of beta material (positive or negative) while the second STL 308 will have the opposite type of beta material (positive or negative) compared to the first STL 306. In the embodiment shown in FIGS. 8A and 8B, the first STL 306 has a positive beta material while the second STL 308 has a negative beta material. The interaction between the applied electric field and the beta material will result in the negative torque at the interface 316 shown in FIG. 8A and the positive torque at the interface 314 shown in FIG. 8B.

In FIG. 8B, the torque curve is shown when two positive beta material layers are opposite to each other. The two positive beta materials are aligned. When the two positive beta materials are in an antiparallel state, the torque is maximized as shown between 100 and 150 $\theta_2$. If, rather than two positive beta material, two negative beta materials were used, the torque curve shown in FIG. 8B would be inverted. The spacers between the two positive beta materials will help maximize the peak of the torque curve.

In FIGS. 7A, 7B, 8A, and 8B, the electric current is applied from the shield towards the main pole. Comparing what is shown in FIGS. 7A and 7B to FIGS. 8A and 8B, the torque between two positive beta materials shown in FIGS. 7B and 8B are substantially identical, but the torque acting on STL from the negative beta material is clearly different in FIGS. 7A and 8A. More specifically, the reflected torque from the STL with a positive polarization results in substantially cancelled negative torque for FIG. 7A at the interface of the STL and a spacer closer to the trailing shield than the main pole. However, when using a bilayer STL as in FIG. 8A, the reflected torque from the STL enhances the torque.

By utilizing a multilayer STL, the negative angle is improved to provide a more effective STL magnetization angle against the gap field and thus, writing utilizing a magnetic recording head is improved.

In one embodiment, a magnetic recording head comprises: a main pole; a trailing shield; one or more side shields; a leading shield; and a spin torque element disposed between the main pole and one or more of the trailing shield, the one or more side shields, and the leading shield, the spin torque element comprising: a first spin torque layer comprising a first magnetic spin torque layer comprising a negative beta material; a second magnetic spin torque layer comprising a positive beta material; and a magnetic layer configured to polarize an electron flow into the first magnetic spin torque layer, wherein the first magnetic spin torque layer is between the magnetic layer and second magnetic spin torque layer. The magnetic layer is configured to polarize an electron flow is a first notch layer comprising a first ferromagnetic material. The spin torque element further comprises: a first spacer layer disposed between a first notch layer and the first spin torque layer, wherein the first spacer layer comprises a first non-magnetic material; The spin torque element further comprises: a second notch layer comprising a second ferromagnetic material; and a second spacer layer disposed between the second spin torque layer and the second notch layer, wherein the second spacer layer comprises a second non-magnetic material. The first ferromagnetic material and the second ferromagnetic material are different. The first ferromagnetic material comprises CoFe, and the second ferromagnetic material comprises FeCr. The first non-magnetic material comprises copper. The second spacer layer comprises a multilayer structure. The multilayer structure comprises a first layer comprising a third material, a second layer comprising a fourth material, and a third layer comprising the third material. The third material comprises chromium and the fourth material comprises copper. The positive beta material comprises CMG, NiFe, or combinations thereof, wherein the first spin torque layer is disposed a first distance to the main pole, wherein the second spin torque layer is disposed a second distance to the main pole, and wherein the second distance is greater than the first distance. The second material comprises FeCr, wherein the first spin torque layer is disposed a first distance to the main pole, wherein the second spin torque layer is disposed a second distance to the main pole, and wherein the first distance is greater than the second distance. A magnetic recording device comprising the magnetic recording head discussed above is also contemplated.

In another embodiment, a magnetic recording head comprises: a main pole; a trailing shield; one or more side shields; a leading shield; and a spin torque element disposed between the main pole and one or more of the trailing shield, the one or more side shields, and the leading shield, the spin torque element comprising: a multilayer spin torque layer structure, wherein the multilayer spin torque structure comprises a first spin torque layer and a second spin torque layer disposed thereon, wherein the first spin torque layer comprises a negative beta material, and wherein the second spin torque layer comprises a positive beta material, wherein the first spin torque layer is disposed closer to a location where current is flows from during operation as compared to the second spin torque layer; and a multilayer spacer layer structure, wherein the multilayer spacer layer includes at least one layer comprising ruthenium. The multilayer spacer layer structure comprises a first spacer layer comprising chromium, copper, or combinations thereof, wherein the at least one layer comprising ruthenium includes a second spacer layer and a third spacer layer, and wherein the first spacer layer is sandwiched between the second spacer layer and the third spacer layer. The multilayer spin torque layer is sandwiched between cobalt containing layers. A magnetic recording device comprising the magnetic recording head is also contemplated.

In another embodiment, a magnetic recording head comprises: a main pole; a trailing shield; one or more side shields; a leading shield; and a spin torque element disposed between the main pole and one or more of the trailing shield, the one or more side shields, and the leading shield, the spin torque element comprising: a first spin torque layer comprising a positive beta material; a second spin torque layer comprising a negative beta material disposed upon the first spin torque layer; and a third spin torque layer comprising the positive beta material disposed upon the second spin torque layer. The positive beta material comprises CMG, NiFe, or combinations thereof, and wherein the negative beta material comprises FeCr. The spin torque element further comprises at least one spacer layer comprising ruthenium. A magnetic recording device comprising the magnetic recording head is also contemplated.

While the foregoing is directed to embodiments of the present disclosure, other and further embodiments of the disclosure may be devised without departing from the basic scope thereof, and the scope thereof is determined by the claims that follow.

What is claimed is:

1. A magnetic recording head, comprising:
   a main pole;
   a trailing shield;
   one or more side shields;
   a leading shield; and
   a spin torque element disposed between the main pole and one or more of the trailing shield, the one or more side shields, and the leading shield, the spin torque element comprising:
   a first magnetic spin torque layer comprising a negative beta material;
   a second magnetic spin torque layer comprising a positive beta material, and
   a magnetic layer configured to polarize an electron flow into the first magnetic spin torque layer, wherein the first magnetic spin torque layer is between the magnetic layer and second magnetic spin torque layer.

2. The magnetic recording head of claim 1, wherein the magnetic layer configured to polarize an electron flow is a first notch layer comprising a first ferromagnetic material, and wherein the spin torque element further comprises:
   a first spacer layer disposed between the first notch layer and the first magnetic spin torque layer, wherein the first spacer layer comprises a first non-magnetic material.

3. The magnetic recording head of claim 2, wherein the spin torque element further comprises:
   a second notch layer comprising a second ferromagnetic material; and
   a second spacer layer disposed between the second magnetic spin torque layer and the second notch layer, wherein the second spacer layer comprises a second non-magnetic material.

4. The magnetic recording head of claim 3, wherein the first ferromagnetic material and the second ferromagnetic material are different.

5. The magnetic recording head of claim 3, wherein the first ferromagnetic material comprises CoFe and the second ferromagnetic material comprises FeCr.

6. The magnetic recording head of claim 3, wherein the second spacer layer comprises a multilayer structure.

7. The magnetic recording head of claim 6, wherein the multilayer structure comprises a first layer comprising a third material, a second layer comprising a fourth material, and a third layer comprising the third material.

8. The magnetic recording head of claim 7, wherein the third material comprises chromium and the fourth material comprises copper.

9. The magnetic recording head of claim 3, wherein the second ferromagnetic material comprises FeCr, wherein the first magnetic spin torque layer is disposed a first distance to the main pole, wherein the second magnetic spin torque layer is disposed a second distance to the main pole, and wherein the first distance is greater than the second distance.

10. The magnetic recording head of claim 2, wherein the first non-magnetic material comprises copper.

11. The magnetic recording head of claim 2, wherein the positive beta material comprises CMG, NiFe, or combinations thereof, wherein the first magnetic spin torque layer is disposed a first distance to the main pole, wherein the second magnetic spin torque layer is disposed a second distance to the main pole, and wherein the second distance is greater than the first distance.

12. A magnetic recording device comprising the magnetic recording head of claim 1.

13. A magnetic recording head, comprising:
    a main pole;
    a trailing shield;
    one or more side shields;
    a leading shield; and
    a spin torque element disposed between the main pole and one or more of the trailing shield, the one or more side shields, and the leading shield, the spin torque element comprising:
    a multilayer spin torque layer structure, wherein the multilayer spin torque layer structure comprises a first spin torque layer and a second spin torque layer disposed thereon, wherein the first spin torque layer comprises a negative beta material, and wherein the second spin torque layer comprises a positive beta material, wherein the first spin torque layer is disposed closer to a location where current flows from during operation as compared to the second spin torque layer; and a multilayer spacer layer structure, wherein the multilayer spacer layer structure includes at least one layer comprising ruthenium.

14. The magnetic recording head of claim 13, wherein the multilayer spacer layer structure comprises a first spacer layer comprising chromium, copper, or combinations thereof, wherein the at least one layer comprising ruthenium includes a second spacer layer and a third spacer layer, and wherein the first spacer layer is sandwiched between the second spacer layer and the third spacer layer.

15. The magnetic recording head of claim 13, wherein the multilayer spin torque layer structure is sandwiched between cobalt containing layers.

16. A magnetic recording device comprising the magnetic recording head of claim 13.

17. A magnetic recording head, comprising:
a main pole;
a trailing shield;
one or more side shields;
a leading shield; and
a spin torque element disposed between the main pole and one or more of the trailing shield, the one or more side shields, and the leading shield, the spin torque element comprising:
　a first spin torque layer comprising a positive beta material;
　a second spin torque layer comprising a negative beta material disposed upon the first spin torque layer; and
　a third spin torque layer comprising the positive beta material disposed upon the second spin torque layer.

18. The magnetic recording head of claim 17, wherein the positive beta material comprises CMG, NiFe, or combinations thereof, and wherein the negative beta material comprises FeCr.

19. The magnetic recording head of claim 17, wherein the spin torque element further comprises at least one spacer layer comprising ruthenium.

20. A magnetic recording device comprising the magnetic recording head of claim 17.

* * * * *